(12) United States Patent
Fan et al.

(10) Patent No.: US 10,829,058 B2
(45) Date of Patent: Nov. 10, 2020

(54) COMBINATORY SENSOR APPARATUS

(71) Applicant: BAIDU ONLINE NETWORK TECHNOLOGY (BEIJING) CO., LTD., Beijing (CN)

(72) Inventors: Zongtao Fan, Beijing (CN); Lintao Li, Beijing (CN); Jing Zhang, Beijing (CN); Junping Wang, Beijing (CN); Bolei Wang, Beijing (CN); Guangzhong Liu, Beijing (CN); Lei Zhu, Beijing (CN); Ji Tao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 6 days.

(21) Appl. No.: 15/725,874

(22) Filed: Oct. 5, 2017

(65) Prior Publication Data

US 2018/0257582 A1   Sep. 13, 2018

(30) Foreign Application Priority Data

Mar. 8, 2017   (CN) .......................... 2017 1 0135964

(51) Int. Cl.
| | | |
|---|---|---|
| *H04N 5/225* | (2006.01) | |
| *B60R 11/04* | (2006.01) | |
| *G01S 19/45* | (2010.01) | |
| *G01S 7/481* | (2006.01) | |
| *B60R 11/00* | (2006.01) | |

(Continued)

(52) U.S. Cl.
CPC ............ *B60R 11/04* (2013.01); *G01S 7/4813* (2013.01); *G01S 19/45* (2013.01); *H04N 5/2251* (2013.01); *B60R 2011/004* (2013.01); *G01S 17/86* (2020.01); *G01S 17/931* (2020.01); *G01S 2013/93273* (2020.01); *H04N 5/23238* (2013.01)

(58) Field of Classification Search
CPC ....... B60R 11/04; G01S 19/45; G01S 7/4813; H04N 5/2251
See application file for complete search history.

(56) References Cited

U.S. PATENT DOCUMENTS 5,473,364 A * 12/1995 Burt ................. G08B 13/19602
                                                        348/47
9,628,170 B1 * 4/2017 Rosenband .............. H04B 7/26
(Continued)

FOREIGN PATENT DOCUMENTS

| CN | 204398994 U | 6/2015 |
|---|---|---|
| CN | 105699985 A | 6/2016 |

*Primary Examiner* — Neil R Mikeska
(74) *Attorney, Agent, or Firm* — Marshall, Gerstein & Borun LLP

(57) ABSTRACT

The present application discloses a combinatory sensor apparatus. The apparatus includes a sensor mounting frame and at least one sensor; the sensor mounting frame includes a sensor mounting base plate and at least one sensor support component, the sensor mounting base plate is mounted on a top of a driverless vehicle, and the at least one sensor support component is mounted on the sensor mounting base plate for supporting the at least one sensor; and the at least one sensor includes a global positioning system antenna and/or a laser radar. This implementation guarantees the consistency of sensor installation locations.

9 Claims, 2 Drawing Sheets

(51) Int. Cl.
  *H04N 5/232* (2006.01)
  *G01S 17/86* (2020.01)
  *G01S 17/931* (2020.01)
  *G01S 13/931* (2020.01)

(56) References Cited

U.S. PATENT DOCUMENTS

| | | | |
|---|---|---|---|
| 9,784,843 B2 * | 10/2017 | Dolinar | G01S 19/14 |
| 9,802,656 B1 * | 10/2017 | Williams | G01S 13/89 |
| 9,884,630 B1 * | 2/2018 | Ross | B60W 40/08 |
| 10,073,178 B2 * | 9/2018 | Hara | G01S 17/936 |
| 10,233,021 B1 * | 3/2019 | Brady | G01C 21/3407 |
| 2008/0024607 A1 * | 1/2008 | Ozaki | G01S 7/497 |
| | | | 348/148 |
| 2008/0167819 A1 * | 7/2008 | Breed | G08G 1/161 |
| | | | 701/300 |
| 2013/0278715 A1 * | 10/2013 | Nutsch | H04N 5/23238 |
| | | | 348/38 |
| 2014/0118179 A1 * | 5/2014 | Alland | G01S 7/025 |
| | | | 342/22 |
| 2015/0142250 A1 * | 5/2015 | Cavender-Bares | A01C 7/00 |
| | | | 701/23 |
| 2015/0330473 A1 * | 11/2015 | Lombrozo | F16F 6/005 |
| | | | 248/569 |
| 2016/0282468 A1 * | 9/2016 | Gruver | G01S 17/93 |
| 2017/0305360 A1 * | 10/2017 | Zajac | B60R 11/04 |
| 2017/0327050 A1 * | 11/2017 | Cabiche | B60R 9/048 |
| 2018/0011173 A1 * | 1/2018 | Newman | G01S 17/936 |
| 2018/0077034 A1 * | 3/2018 | Liang | H04J 3/0661 |
| 2018/0201273 A1 * | 7/2018 | Xiao | B60W 40/09 |
| 2018/0219878 A1 * | 8/2018 | Hirshberg | G06F 21/85 |
| 2018/0229933 A1 * | 8/2018 | Hofmann | B62D 65/18 |
| 2018/0273032 A1 * | 9/2018 | Yang | B60W 30/12 |

* cited by examiner

COMBINATORY SENSOR APPARATUS

CROSS-REFERENCE TO RELATED APPLICATION

This application is related to and claims the priority from Chinese Application No. 201710135964.0, filed on Mar. 8, 2017, entitled "Combinatory Sensor Apparatus," the entire disclosure of which is incorporated herein by reference.

TECHNICAL FIELD

The present application relates to the field of driverless technology, and particularly to the field of sensor technology, and especially to a combinatory sensor apparatus.

BACKGROUND

With the continuous development of driverless technology, how to get the environmental information, such as pedestrians, vehicles, traffic lights and the like, within the vehicle driving range, and under the complex road structure and crowded traffic environment conditions, has become a key technology affecting the development of the driverless vehicles. Likewise, how to reasonably arrange and install a variety of sensors in the driverless vehicle such that the various functional indicators of the sensors play to the best level has also evolved to be imperative.

Currently, the sensors are usually installed by installing discretely the various sensors on the vehicle body through local alterations of the vehicle. However, this installation approach cannot guarantee the consistency of the sensor installation locations, and when the sensor locations need to be changed, locations on the vehicle body often need to be modified locally.

SUMMARY

An object of the present application is to provide an improved combinatory sensor apparatus to solve the technical problems mentioned in the above background section.

Embodiments of the present application provide a combinatory sensor apparatus, and the apparatus includes a sensor mounting frame and at least one sensor; the sensor mounting frame includes a sensor mounting base plate and at least one sensor support component, the sensor mounting base plate is mounted on a top of a driverless vehicle, and the at least one sensor support component is mounted on the sensor mounting base plate for supporting the at least one sensor; and the at least one sensor includes a global positioning system antenna and/or a laser radar.

In some embodiments, the at least one sensor further includes a camera, the laser radar and/or the camera is mounted in at least one of following locations: an end of the sensor mounting frame proximate to a front of the driverless vehicle, an end of the sensor mounting frame proximate to a rear of the driverless vehicle, and two ends of the sensor mounting frame proximate to sides of the driverless vehicle.

In some embodiments, the camera includes a front-view camera and a surround-view camera, and the front-view camera is mounted at the end of the sensor mounting frame proximate to the front of the driverless vehicle, and the surround-view camera is mounted in at least one of following locations: an end of the sensor mounting frame proximate to the front of the driverless vehicle, an end of the sensor mounting frame proximate to the rear of the driverless vehicle, and two ends of the sensor mounting frame proximate to the sides of the driverless vehicle.

In some embodiments, at least two front-view cameras with different focal lengths are mounted on an end of the sensor mounting frame proximate to the front of the driverless vehicle.

In some embodiments, the laser radar includes a 64-line laser radar and a 16-line laser radar, and the 64-line laser radar or the 16-line laser radar is mounted on the top of the sensor mounting frame, and the 16-line laser radar is mounted in at least one of following locations: an end of the sensor mounting frame proximate to the front of the driverless vehicle, an end of the sensor mounting frame proximate to the rear of the driverless vehicle, and two ends of the sensor mounting frame proximate to the sides of the driverless vehicle.

In some embodiments, the sensor support component comprises at least one of following items: a position adjustable support component, an angle adjustable support component, and a height adjustable support component.

In some embodiments, the position adjustable support component is configured to support the global positioning system antenna so as to adjust a position of the global positioning system antenna, the angle adjustable support component is configured to support the 16-line laser radar and/or the cameras so as to adjust an angle of the 16-line laser radar and/or the cameras, and the height adjustable support component is configured to support the 64-line laser radar so as to adjust a height of the 64-line laser radar In some embodiments, the 64-line laser radar is mounted at a center location on the top of the sensor mounting frame, and the 16-line laser radars are mounted in following locations respectively: the two ends of the sensor mounting frame proximate to the sides of the driverless vehicle and the end of the sensor mounting frame proximate to the rear of the driverless vehicle, and the front-view camera is mounted at the end of the sensor mounting frame proximate to the front of the driverless vehicle, and the surround-view cameras are mounted in following locations respectively: the end of the sensor mounting frame proximate to the front of the driverless vehicle, the end of the sensor mounting frame proximate to the rear of the driverless vehicle, and the two ends of the sensor mounting frame proximate to the sides of the driverless vehicle.

In some embodiments, the sensor mounting frame further comprises a base plate support component, the base plate support component is mounted between the top of the driverless vehicle and the sensor mounting base plate for supporting the sensor mounting base plate.

In some embodiments, the sensor mounting frame further comprises holding parts, the holding parts are fixedly connected to the roof of the driverless vehicle for holding the sensor mounting base plate or the base plate support component on the top of the driverless vehicle.

In some embodiments, the apparatus further comprises a housing for sealing the sensor mounting frame and the at least one sensor.

The combinatory sensor apparatus provided in the embodiment of the present application may fix the relative position relationship between the sensors by mounting at least one sensor on the sensor mounting frame, so as to ensure the consistency of the sensor mounting positions.

BRIEF DESCRIPTION OF THE DRAWINGS

Other features, objects, and advantages of the present application will become more apparent by reading the detailed description of the non-limiting embodiments with reference to the following drawings.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1A:
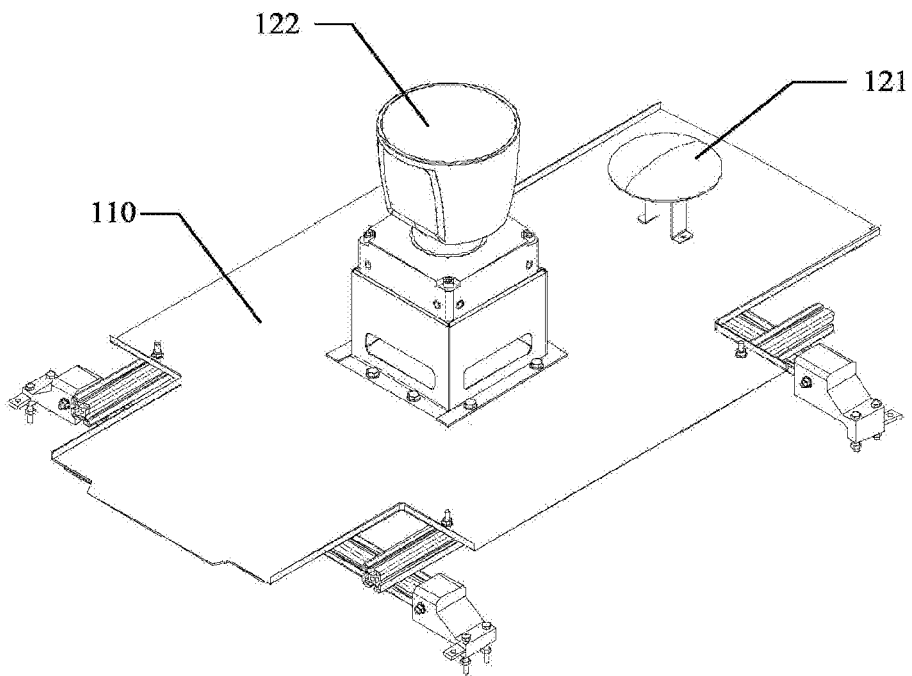
FIG. 1A shows a schematic structural view of an embodiment of the combinatory sensor apparatus of the present application.

Referring to 1A, there is shown a schematic structural view of an embodiment of the combinatory sensor apparatus according to the present application. As shown in FIG. 1A, the combinatory sensor apparatus of the present embodiment may include a sensor mounting frame 110 and at least one sensor.

In the present embodiment, the material of the sensor mounting frame 110 may be ordinary thin steel plate, usually made by welding a base plate and a stiffener (commonly known as reinforcing rib) together. A mounting position for the sensor may be reserved on the sensor mounting frame 110. During the structural design process, there may be situations where the structure has an oversized suspended surface or an oversized span. Under those situations, the connecting surface of the structural part may only carry limited load. Therefore a stiffener is required to be added to a common vertical plane between two combination bodies. The sensor mounting frame 110 may have characteristics such as corrosion resistance, anti-deformation, durable, and light weight. Therefore, the sensor mounting frame 110 may be made of any material having these characteristics.

In the present embodiment, the at least one sensor may include at least one of a Global Positioning System (GPS) antenna 121 and a laser radar 122. The global positioning system antenna 121 may be configured to obtain location information of a driverless vehicle. The laser radar 122 is a radar system that detects characteristic quantity such as the position, speed, and the like of the target by emitting a laser beam. In general, the laser radar 122 and the global positioning system antenna 121 may be mounted on the top of the sensor mounting frame 110. As an example, the laser radar 122 in FIG. 1A may be a 64-line laser radar. Typically, a 64-line laser radar may be mounted directly above the roof of a driverless vehicle and may rotate 360° continuously to collect environmental data around the driverless vehicle while the vehicle is moving.

In some alternative implementations of the present embodiment, the sensor may also include a camera, which may be configured to identify traffic lights, road traffic lines, various traffic signs, and front obstructions. At least one of laser radar and a camera may be mounted in at least one of following locations: the end of the sensor mounting frame 110 proximate to the front of the driverless vehicle, the end of the sensor mounting frame 110 proximate to the rear of the driverless vehicle, and the two ends of the sensor mounting frame 110 proximate to the sides of the driverless vehicle.

In some alternative implementations of the present embodiment, the camera may include a front-view camera and a surround-view camera. The front-view camera is an on-vehicle camera installed in the front of the vehicle, which may monitor intuitively the obstacles in front of the vehicle. Surround-view camera, also known as panoramic image monitoring system, may splice the pictures monitored in all directions around the vehicle, and dynamically display them on the LCD screen inside the vehicle. In addition, the surround-view camera may also identify the parking lane marking, curb and nearby vehicles. The front-view camera may be mounted at the end of the sensor mounting frame 110 proximate to the front of a driverless vehicle to monitor an obstacle in front of the vehicle. The surround-view camera is mounted in at least one of the following locations: the end of the sensor mounting frame 110 proximate to the front of the driverless vehicle, the end of the sensor mounting frame 110 proximate to the rear of the driverless vehicle, and the two ends of the sensor mounting frame 110 proximate to the sides of the driverless vehicle.

In some alternative implementations of the present embodiment, the laser radar 122 includes a 64-line laser radar and a 16-line laser radar. The 64-line laser radar may rotate 360° continuously to collect environmental data around the driverless vehicle while the vehicle is running. The 16-line laser radar may be configured to collect environmental data from dead zone around the vehicle body. The 16-line laser radar is mounted in at least one of the following locations: the end of the sensor mounting frame 110 proximate to the front of the driverless vehicle, the end of the sensor mounting frame 110 proximate to the rear of the driverless vehicle, and the two ends of the sensor mounting frame 110 proximate to the sides of the driverless vehicle.

In some alternative implementations of the present embodiment, the combinatory sensor apparatus may further comprise a housing (not shown) for sealing the sensor mounting frame 110 and the at least one sensor, and the housing may isolate the sensor from the external environment to a certain extent to ensure that the sensor may also work properly in harsh environment.

Figure 1B:
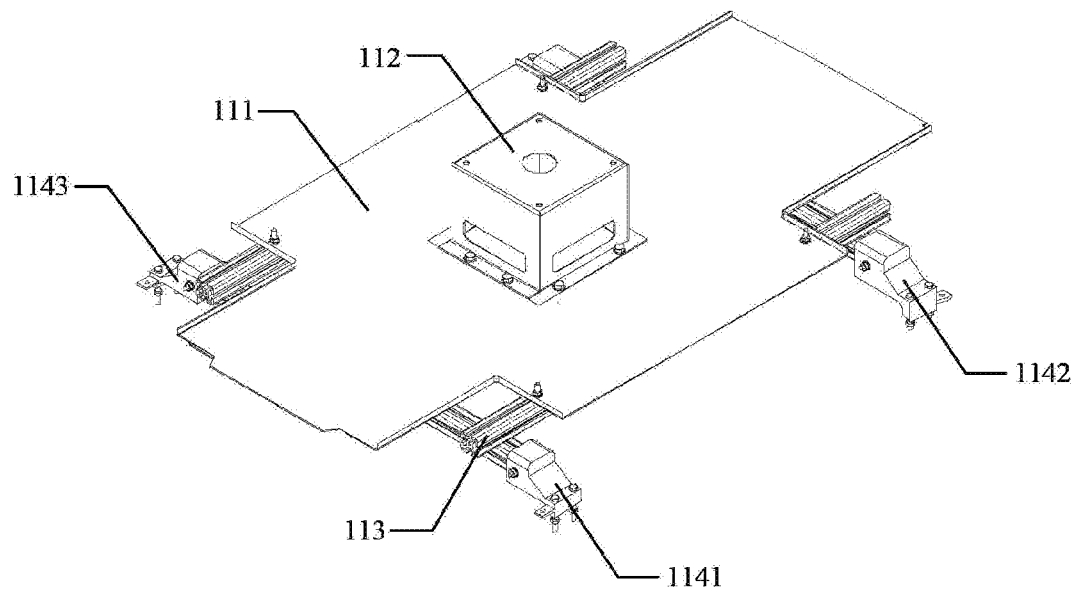
FIG. 1B shows a schematic structural view of an embodiment of the sensor mounting frame of the combinatory sensor apparatus of FIG. 1A.

Referring to 1B, there is shown a schematic structural view of an embodiment of a sensor mounting frame of the combinatory sensor apparatus in FIG. 1A. As shown in FIG. 1B, the sensor mounting frame may include a sensor mounting base plate 111 and at least one sensor support component 112. The sensor mounting base plate 111 may be mounted on a top of a driverless vehicle, and the sensor mounting base plate 111 may be reserved with a mounting position for the at least one sensor support component 112.

The at least one sensor support component 112 may be mounted on the sensor mounting base plate 111 for supporting the at least one sensor.

In some alternative implementations of the present embodiment, the sensor mounting frame may include a base plate support component 113, the base plate support component 113 may be mounted between a top of a driverless vehicle and the sensor mounting base plate 111 for supporting the sensor mounting base plate 111. The base plate support component 113 may include at least two longitudinal base plate support component parallel to the sides of the driverless vehicle and at least two transverse base plate support component perpendicular to the base plate support component, and the longitudinal base plate support component may be disposed on the transverse base plate support component. The transverse base plate support component may also be disposed on the longitudinal base plate support component. In order to adapt the combinatory sensor apparatus in the present application to more vehicle models and to better accommodate the external environment (e.g., heights of the traffic light, etc.), a guide rail may be used as the base plate support component 113, and the sensor mounting base plate 111 may be movable on the guide rail, and the position of at least one sensor is adjusted by adjusting the position of the sensor mounting base plate 111 to better acquire the information of surrounding environment.

In some alternative implementations of the present embodiment, the sensor mounting frame may include a holding part, one end of the holding part may be fixedly connected to the roof of the driverless vehicle, and the other end thereof may be mounted on the base plate support component 113 or the sensor mounting base plate 111, such that the sensor mounting frame is fixed on the top of the driverless vehicle. As an example, the sensor mounting frame in FIG. 1B may include holding parts 1141, 1142, 1143 and another non-illustrated holding part.

The combinatory sensor apparatus provided in the above-described embodiment of the present application may fix the relative position relationship between the sensors by mounting at least one sensor on the sensor mounting frame, so as to ensure the consistency of the sensor mounting positions.

Figure 2A:
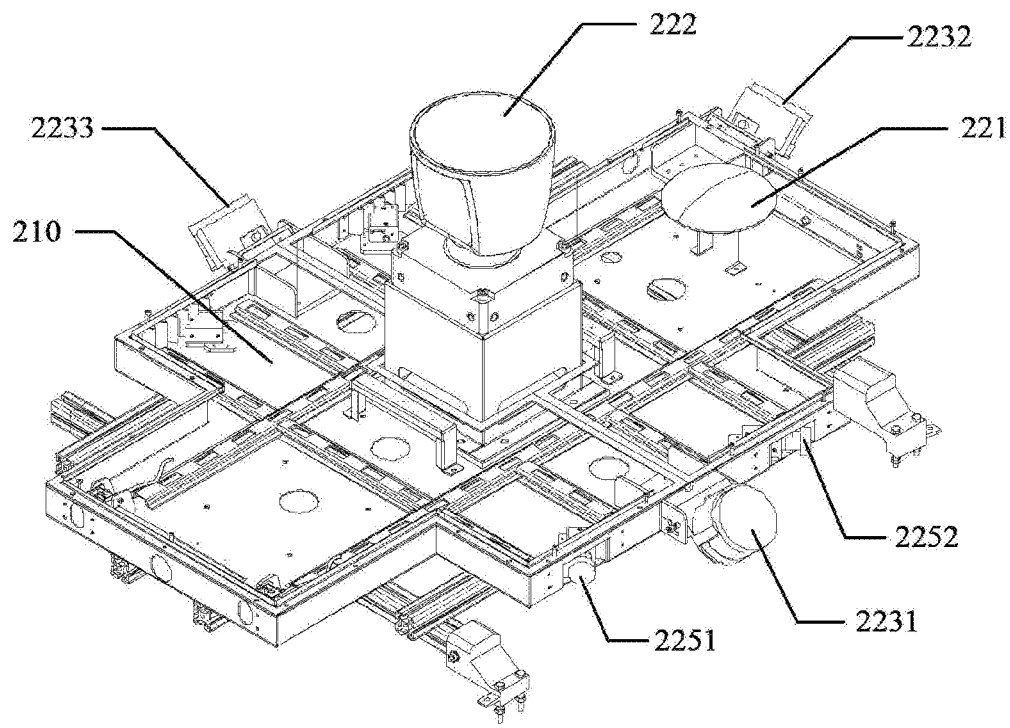
FIG. 2A shows a schematic structural view of another embodiment of the combinatory sensor apparatus of the present application.

Continue referring to FIG. 2A, there is shown a schematic structural view of another embodiment of the combinatory sensor apparatus of the present application. As shown in FIG. 2A, the combinatory sensor apparatus in this embodiment may include a sensor mounting frame 210 and at least one sensor.

In the present embodiment, in order to obtain more data, the combinatory sensor apparatus is generally provided with a plurality of sensors. As an example, the combinatory sensor apparatus in FIG. 2A may include a global positioning system antenna 221, a 64-line laser radar 222, 16-line laser radars 2231, 2232 and 2233, the front-view camera (not shown), and surround-view cameras 2251 and 2252 (additional four surround-view cameras are not shown due to the perspective of FIG. 2A).

In the present embodiment, the 64-line laser radar 222 may be mounted at a center location on the top of the sensor mounting frame 210. The 64-line laser radar, as a main apparatus for sensing the surrounding environment, has a higher requirement for its mounting position, for example to take full advantage of scanning range of 64-line laser radar, to reduce blocking the 64-line laser radar by the body and other parts of the vehicle.

In the present embodiment, the global positioning system antenna 221 may be mounted in an area between the center of the top of the sensor mounting frame 210 and an end of the sensor mounting frame 210 proximate to the rear of the driverless vehicle. The global positioning system antenna 221 may be configured to obtain positioning information of the driverless vehicle.

In the present embodiment, the 16-line laser radar 2232 may be mounted at the end of the sensor mounting frame 210 proximate to the rear of the driverless vehicle, and the 16-line laser radars 2231 and 2233 may be mounted at both ends of the sensor mounting frame 210 proximate to the sides of the driverless vehicle respectively. The 16-line laser radars may be configured to collect environmental data from blind zone around the vehicle body.

In the present embodiment, the front-view cameras may be mounted on the left and right sides at the end of the sensor mounting frame 210 proximate to the front of the driverless vehicle respectively. The front-view cameras may identify traffic lights, road surface markings, various traffic signs, front obstructions and the like.

In some alternative implementations of the present embodiment, in order to accommodate different road conditions, the lens focal lengths of the two front-view cameras on the left and right sides at the end of the sensor mounting frame 210 proximate to the front of the driverless vehicle may be set to different focal lengths.

In the present embodiment, the surround-view cameras 2251 and 2252 may be mounted on both sides at the end of the sensor mounting frame 210 proximate to the left side of the driverless vehicle respectively, the surround-view cameras (not shown) may be mounted a center location at the end of the sensor mounting frame 210 proximate to the front of the driverless vehicle, the surround-view cameras (not shown due to the position relationship in FIG. 2A) may also be mounted on the two sides at the end of the sensor mounting frame 210 proximate to the right side of the driverless vehicle respectively. The surround-view cameras (not shown due to the perspective of FIG. 2A) may also be mounted at a center location at the end of the sensor mounting frame 210 proximate to the rear of the driverless vehicle. Surround-view camera, also known as panoramic image monitoring system, may splice the pictures taken in all directions around the vehicle, and dynamically display them on the LCD screen inside the vehicle. In addition, the surround-view camera may also identify the parking lane marking, curb and nearby vehicles.

It should be noted that, in order to adapt to the installed vehicle models and traffic information etc., the corresponding sensors may be turned on or be installed and/or disassembled according to actual needs to perceive the surrounding environment, so as to ensure the driving safety for driverless vehicles.

Figure 2B:
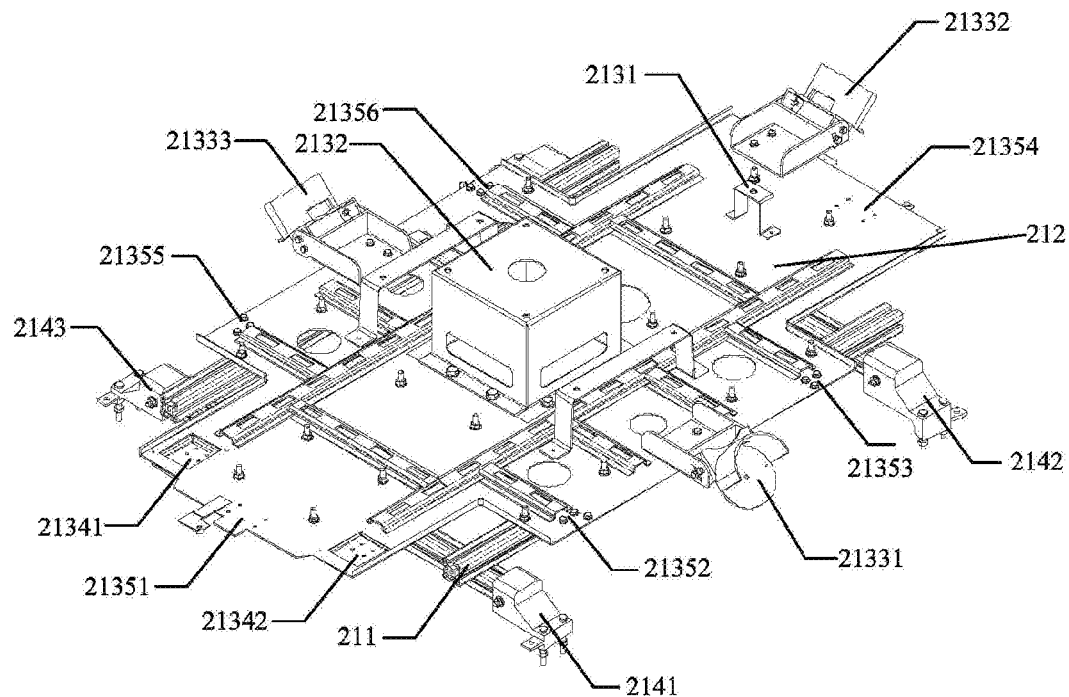
FIG. 2B shows a schematic structural view of another embodiment of the sensor mounting frame of the combinatory sensor apparatus of FIG. 2A.

Continue with reference to FIG. 2B, which shows a schematic structural view of another embodiment of the sensor mounting frame of the combinatory sensor apparatus of FIG. 2A. As shown in FIG. 2B, the sensor mounting frame may include a base plate support component 211, a sensor mounting base plate 212, at least one sensor support component and holding parts. As an example, the sensor mounting frame in FIG. 2B may include holding parts 2141, 2142, 2143 and another non-illustrated holding part.

In the present embodiment, the base plate support component 211 may be mounted between the top of driverless vehicle and the sensor mounting base plate 212 for supporting the sensor mounting base plate 212. The base plate support component 211 may include at least two longitudinal base plate support component parallel to the doors of the driverless vehicle and at least two transverse base plate support component perpendicular to the longitudinal base plate support component, and the longitudinal base plate support component may be disposed on the transverse base plate support component, or the transverse base plate support component may also be disposed on the longitudinal base plate support component.

In the present embodiment, the sensor mounting base plate 212 may be mounted on the top of driverless vehicle. The sensor mounting base plate 212 may reserve a mounting position for at least one sensor support component.

In the present embodiment, the at least one sensor support component may include sensor support components 2131, 2132, 21331, 21332 and 21333, and support component mounting grooves 21341, 21342, 21351, 21352, 21353, 21354, 21355 and 21356, wherein the support component mounting grooves are configured to mount the sensor support components.

Herein, the sensor support components 2132 may be mounted a center location on the top of sensor mounting base plate 212 for supporting 64-line laser radar 222.

Herein, the sensor support components 2132 may be mounted in area between the center of the top of the sensor mounting base plate 212 and the end of the sensor mounting base plate 212 proximate to the rear of the driverless vehicle for supporting global positioning system antenna 211.

Herein, the sensor support components 21331 and 21333 may be mounted at both ends of the sensor mounting base plate 212 proximate to the sides of the driverless vehicle respectively. The sensor support component 21332 may be mounted the rear of the driverless vehicle, for supporting 16-line laser radars 2231, 2232 and 2233 respectively.

Herein, the sensor mounting base plate 212 may be reserved with a position for the support component mounting grooves, and the support component mounting grooves are configured to mount the sensor support components. The support component mounting grooves 21341 and 21342 may be configured to fix the sensor support components of the two front-view cameras (not shown) on both sides of one end of the sensor mounting base plate 212 proximate to the front of the driverless vehicle so as to fix the front-view cameras.

Herein, the support component mounting groove 21351 may be configured to fix the sensor support components of surround-view cameras (not shown) at a center location at an end of the sensor mounting base plate 212 proximate to the front of the driverless vehicle so as to fix surround-view cameras. Support component mounting grooves 21352 and 21353 may be configured to fix the sensor support components of the surround-view cameras 2251 and 2252 on both sides at an end of the sensor mounting base plate 212 proximate to the left side of the driverless vehicle so as to fix the surround-view cameras 2251 and 2252. Support component mounting groove 21354 may be configured to fix the sensor support components of the surround-view cameras (not shown) at a center location on an end of sensor mounting base plate 212 proximate to a rear of the driverless vehicle so as to fix the surround-view cameras. The support component mounting grooves 21355 and 21356 may be configured to fix the sensor support components of the surround-view cameras (not shown) on both sides at an end of the sensor mounting base plate 212 proximate to the right side of the driverless vehicle so as to fix surround-view cameras.

In some alternative implementations of the present embodiment, the sensor support components may include, but not limited to, at least one of following items: a position adjustable support component, an angle adjustable support component, and a height adjustable support component. The position adjustable support component may adjust the position of the supported sensor, the angle adjustable support component may adjust the angle of the supported sensor, the height adjustable support component may adjust the height of the supported sensor. As an example, in FIG. 2B, the position adjustable support component may include the sensor support component 2131, the angle adjustable support component may include the sensor support components 21331, 21332 and 21333, and the height adjustable support component may include the sensor support component 2132. By using the adjustable sensor support component, the position, angle and height or the like of the sensor can be adjusted for information such as different vehicle models and road conditions (e.g., heights of traffic lights, etc.), thereby enhancing the adaptability of the combinatory sensor apparatus in the above embodiment.

In some alternative implementations of the present embodiment, the sensor mounting frame may also include a holding part, one end of the holding part may be fixedly connected to the roof of the driverless vehicle, and the other end thereof may be mounted on the base plate support component 211 or the sensor mounting base plate 212, such that the sensor mounting frame is fixed on the top of the driverless vehicle. As an example, the sensor mounting frame in FIG. 2B may include holding parts 2141, 2142, 2143 and another non-illustrated holding part.

It should be noted that, the present application does not define the specific positions of the sensor support components 2131, 2132, 21331, 21332 and 21333, and the support component mounting grooves 21341, 21342, 21351, 21352, 21353, 21354, 21355 and 21356 on the sensor mounting base plate 212, as long as the global positioning system antenna 221, 64-line laser radar 222, 16-line laser radars 2231, 2232 and 2233, front-view cameras, surround-view cameras 2251,2252 and four non-illustrated cameras supported by the sensor support components 2131, 2132, 21331, 21332 and 21333, and the support component mounting grooves 21341, 21342, 21351, 21352, 21353, 21354, 21355 and 21356, respectively, may function properly.

The combinatory sensor apparatus provided by the above-described embodiments of the present application, by properly installing sensors on the sensor mounting frame and describing the mounting positions of the respective sensors, optimally utilizes the sensors for sensing the surrounding environment and ensures the driving safety of the driverless vehicle.

It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A combinatory sensor apparatus comprising a sensor mounting frame and a plurality of sensors;

the sensor mounting frame comprising a sensor mounting base plate, and at least one sensor support component, the sensor mounting base plate mounted on a top of a driverless vehicle, and the at least one sensor support component mounted on the sensor mounting base plate for supporting the at least one sensor; and the plurality of sensors comprising a global positioning system antenna and a plurality of laser radars;

wherein the sensor mounting frame further comprises a base plate support component for supporting the sensor mounting base plate, the base plate support component being a guide rail mounted between the top of the driverless vehicle and the sensor mounting base plate, and the sensor mounting base plate is movable on the guide rail; and wherein the plurality of laser radars comprise a 64-line laser radar and a plurality of 16-line laser radars, the 64-line laser radar is mounted in a center of a top of the sensor mounting frame, and the 16-line laser radars are mounted in following locations respectively: an end of the sensor mounting frame proximate to the front of the driverless vehicle, an end of the sensor mounting frame proximate to the rear of the driverless vehicle, and two ends of the sensor mounting frame proximate to the sides of the driverless vehicle.

2. The apparatus according to claim 1, wherein the plurality of sensors further comprise a camera, the camera is mounted in at least one of following locations: the end of the sensor mounting frame proximate to a front of the driverless vehicle, the end of the sensor mounting frame proximate to a rear of the driverless vehicle, and the two ends of the sensor mounting frame proximate to the sides of the driverless vehicle.

3. The apparatus according to claim 2, wherein the camera comprises a front-view camera and a surround-view camera, and the front-view camera is mounted at the end of the sensor mounting frame proximate to the front of the driverless vehicle, and the surround-view camera is mounted in at least one of following locations: the end of the sensor mounting frame proximate to the front of the driverless vehicle, the end of the sensor mounting frame proximate to the rear of the driverless vehicle, and the two ends of the sensor mounting frame proximate to the sides of the driverless vehicle.

4. The apparatus according to claim 3, wherein at least two front-view cameras with different focal lengths are mounted at the end of the sensor mounting frame proximate to the front of the driverless vehicle.

5. The apparatus according to claim 1, wherein the sensor support component comprises at least one of following items: a position adjustable support component, an angle adjustable support component, and a height adjustable support component.

6. The apparatus according to claim 5, wherein the position adjustable support component is configured to support the global positioning system antenna so as to adjust a position of the global positioning system antenna, the angle adjustable support component is configured to support the 16-line laser radars and/or the cameras so as to adjust an angles of the 16-line laser radars and/or the cameras, and the height adjustable support component is configured to support the 64-line laser radar so as to adjust a height of the 64-line laser radar.

7. The apparatus according to claim 1, wherein, and the front-view camera is mounted at the end of the sensor mounting frame proximate to the front of the driverless vehicle; and surround-view cameras are mounted in following locations respectively: the end of the sensor mounting frame proximate to the front of the driverless vehicle, the end of the sensor mounting frame proximate to the rear of the driverless vehicle, and the two ends of the sensor mounting frame proximate to the sides of the driverless vehicle.

8. The apparatus according to claim 1, wherein the sensor mounting frame further comprises holding parts, the holding parts are fixedly connected to the roof of the driverless vehicle for holding the sensor mounting base plate or the base plate support component on the top of the driverless vehicle.

9. The apparatus according to claim 1, wherein the apparatus further comprises a housing for sealing the sensor mounting frame and the at least one sensor.

\* \* \* \* \*